United States Patent [19]
Archila

[11] 3,994,217
[45] Nov. 30, 1976

[54] WEIGHING SCALE DIGITAL PRINTER

[76] Inventor: Julio R. Archila, 708 27th Ave., Greeley, Colo. 80631

[22] Filed: Apr. 4, 1975

[21] Appl. No.: 565,139

[52] U.S. Cl. .................................. 101/35; 101/43; 197/1 R; 197/171
[51] Int. Cl.² ........................................ B41F 17/00
[58] Field of Search .................... 197/1 R, 150, 171; 101/43, 35, 41, 42, 44, 93.04, 93.05

[56] References Cited
UNITED STATES PATENTS

| | | | |
|---|---|---|---|
| 3,080,813 | 3/1963 | Staub et al. | 101/43 |
| 3,099,711 | 7/1963 | Foley et al. | 197/1 R X |
| 3,209,681 | 10/1965 | Sanborn | 197/1 R X |
| 3,312,163 | 4/1967 | Muyshondt | 197/1 R X |
| 3,367,469 | 2/1968 | Fathauer | 197/1 R |
| 3,400,801 | 9/1968 | Swenson | 197/171 |
| 3,561,355 | 2/1971 | Rapparlie et al. | 197/1 R |
| 3,598,218 | 8/1971 | Gilovich et al. | 197/1 R |
| 3,770,093 | 11/1973 | DeHart et al. | 197/1 R X |
| 3,819,026 | 6/1974 | Ploeger et al. | 197/171 |
| 3,820,643 | 6/1974 | Priebs et al. | 197/1 R |

*Primary Examiner*—Ralph T. Rader

[57] ABSTRACT

In one form of the invention, an electronic scale transmits data responsive to the weight of an article on the scale to a driver or control unit which activates selected segments of a digital printer to project those segments beyond the face of the printer for inking and subsequently applying indicia to the article showing its weight. Also, visual display means may be provided with the electronic scale. The digital segments are activated simultaneously by a switch on the portable printer and remain in extended locked position until the switch is subsequently closed to activate the printer to release those segments which have been extended and to extend segments indicative of a new weight on the scale. In a second form of the invention, an electronic scale activates a stationary printer which sequentially extends and retracts the segments for each digit to be printed onto a box which has been previously been weighed.

11 Claims, 19 Drawing Figures

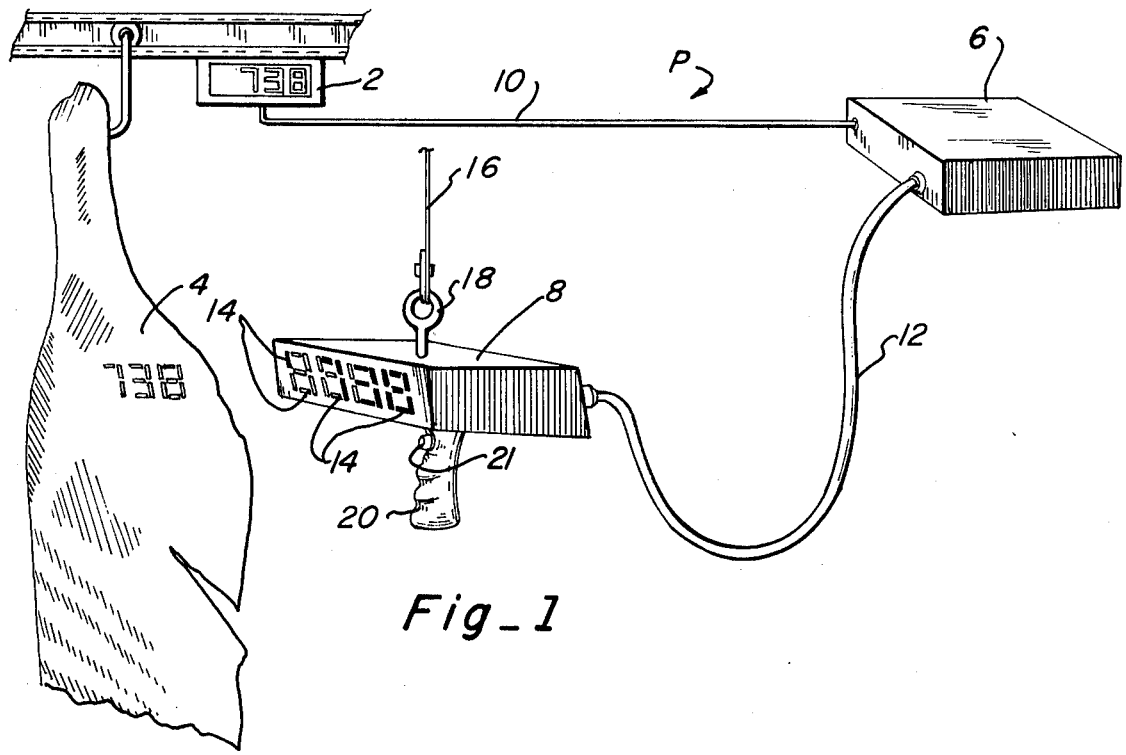
Fig_1
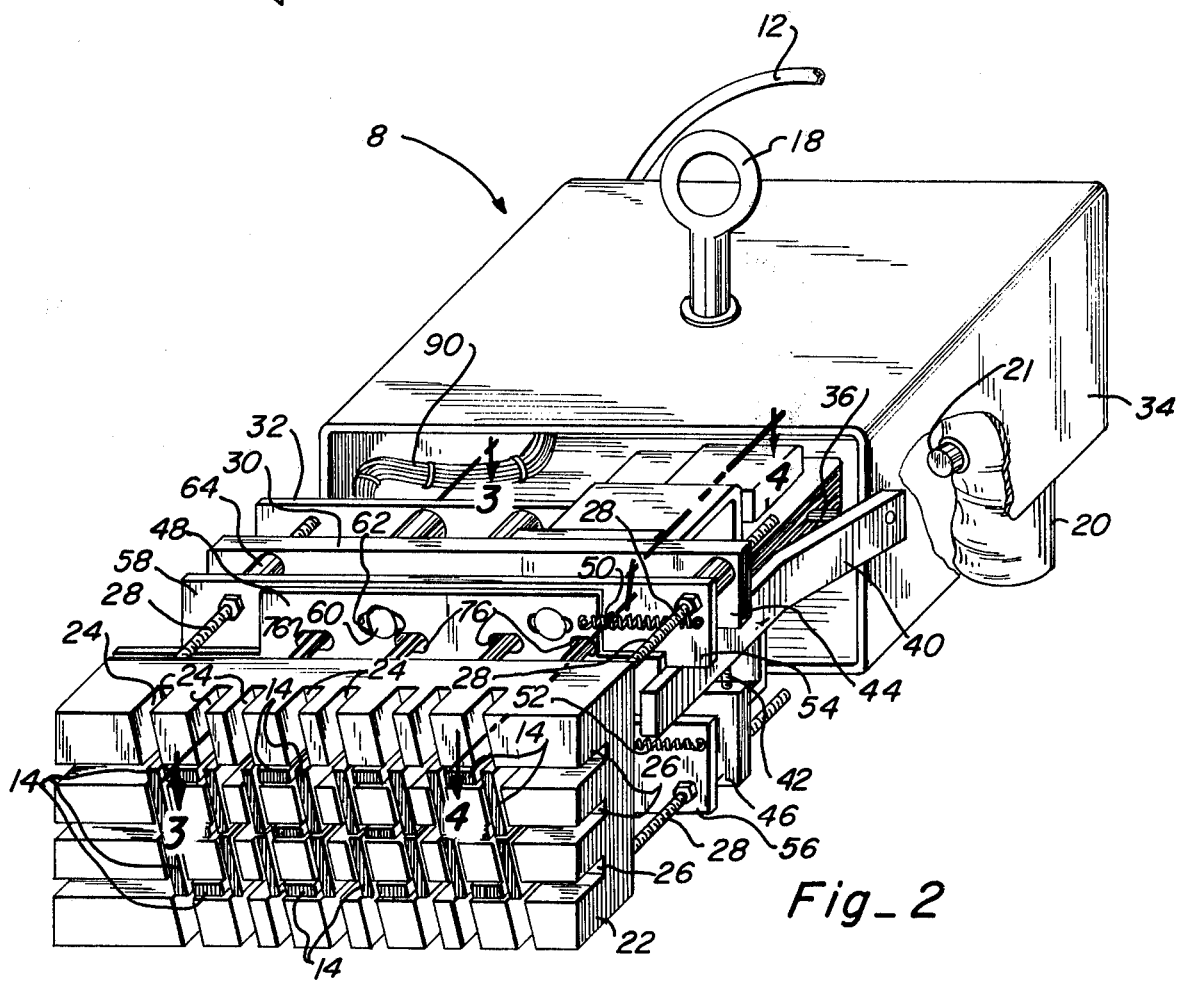
Fig_2

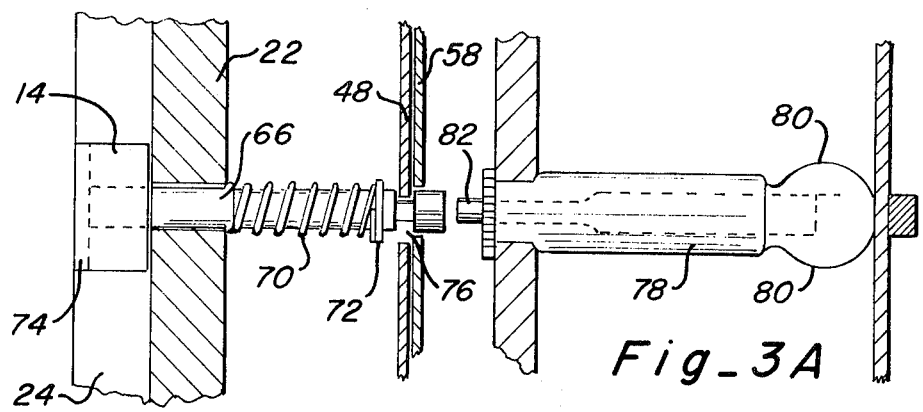
Fig_3A
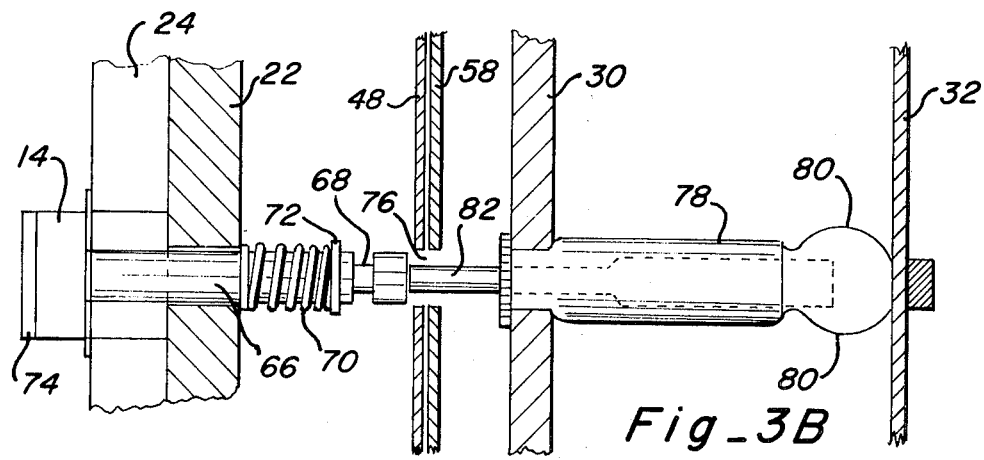
Fig_3B
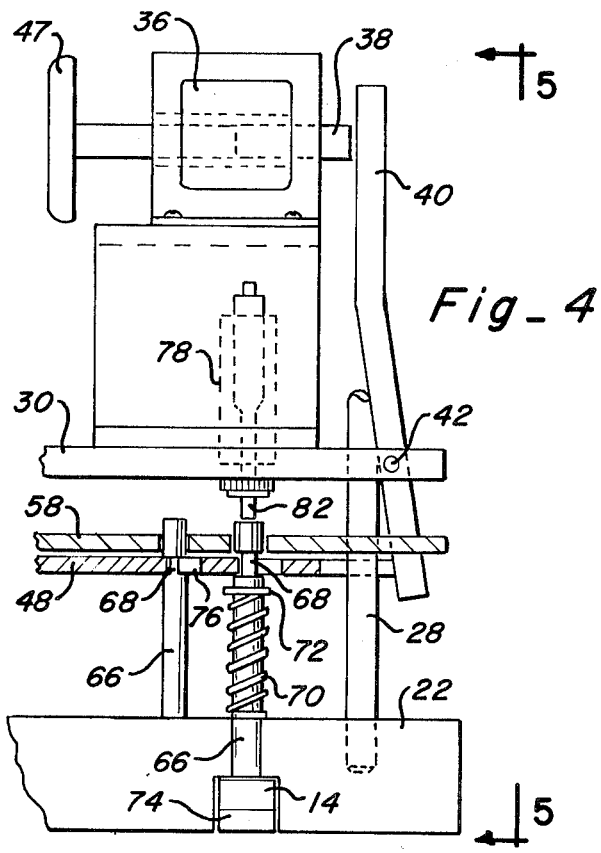
Fig_4
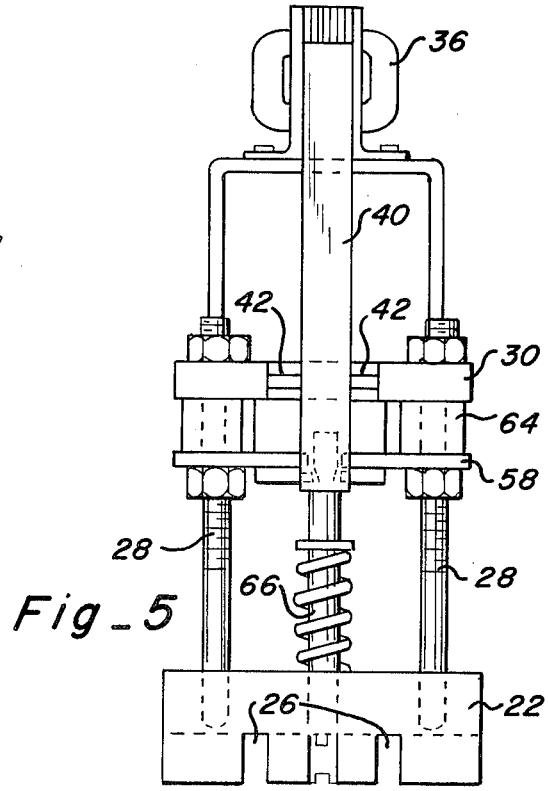
Fig_5

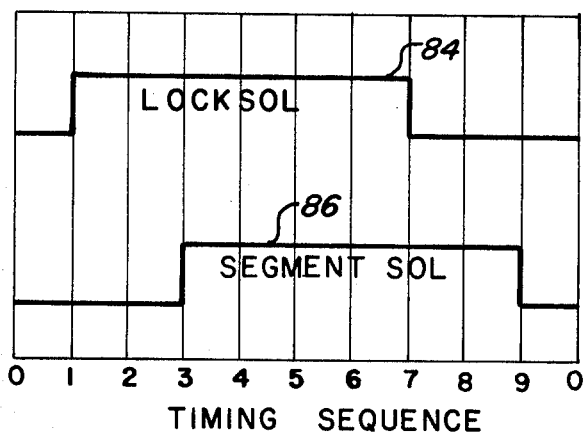
Fig_6
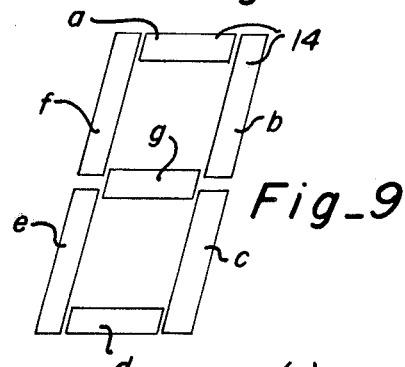
Fig_8
Fig_9
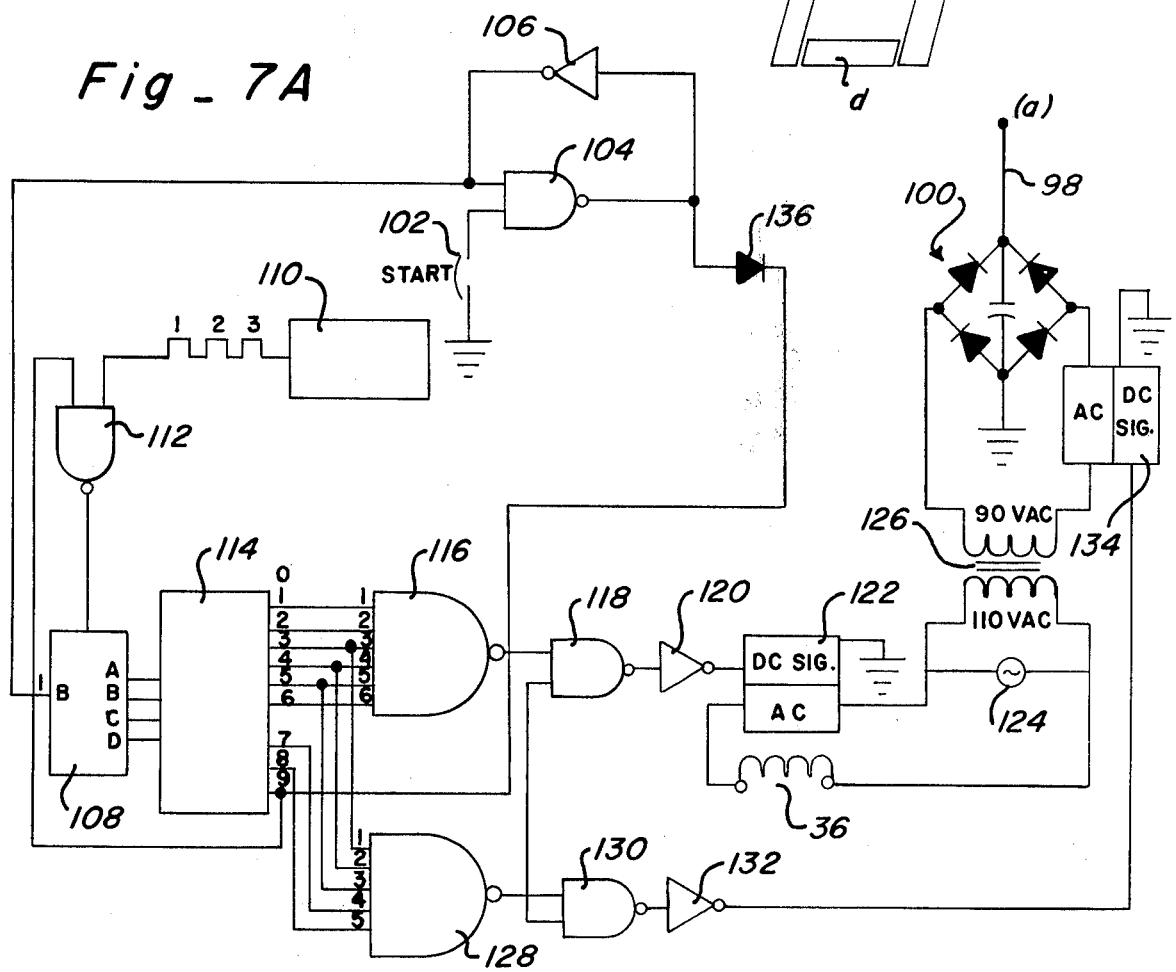
Fig_7A

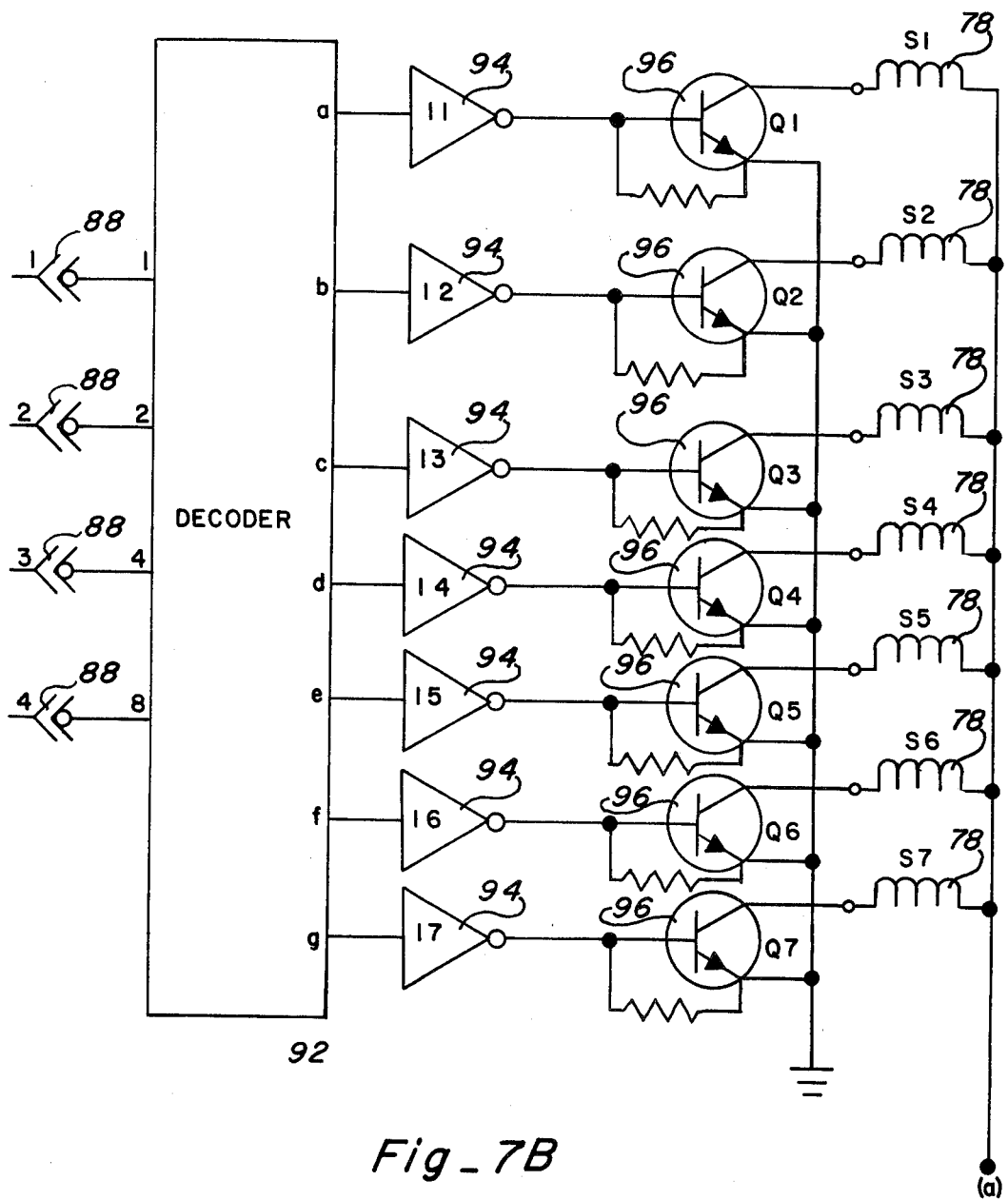
Fig_7B

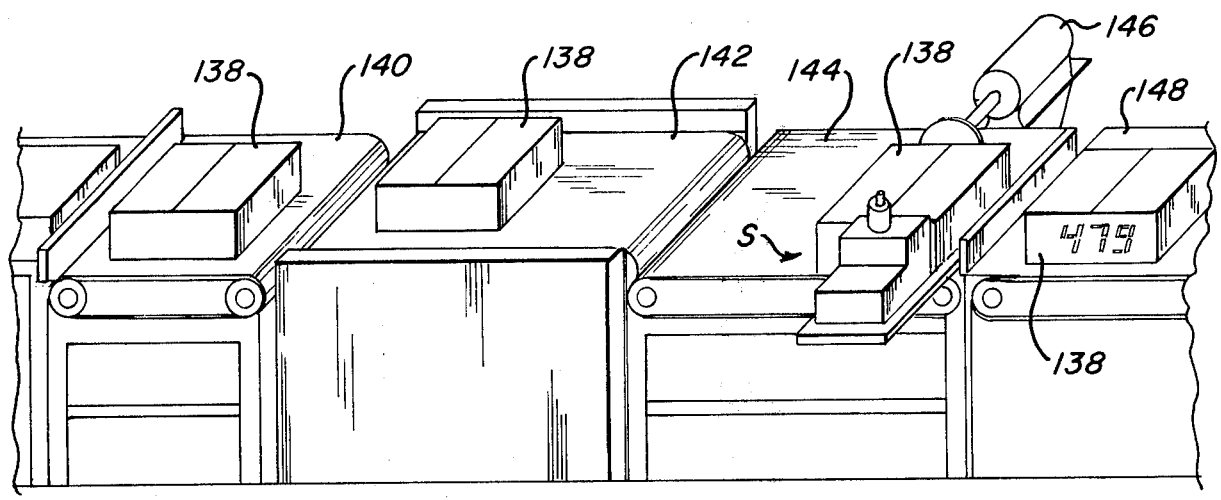
Fig_10
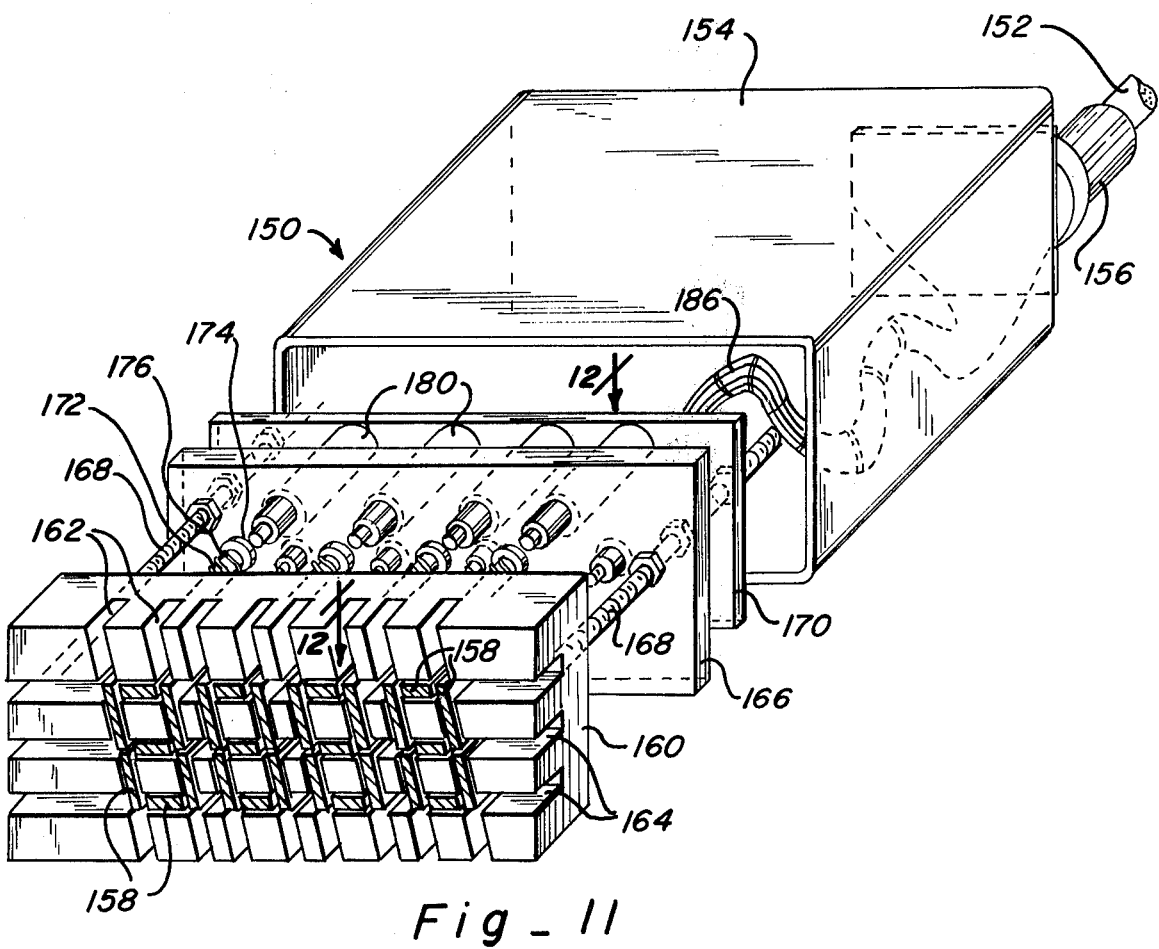
Fig_11

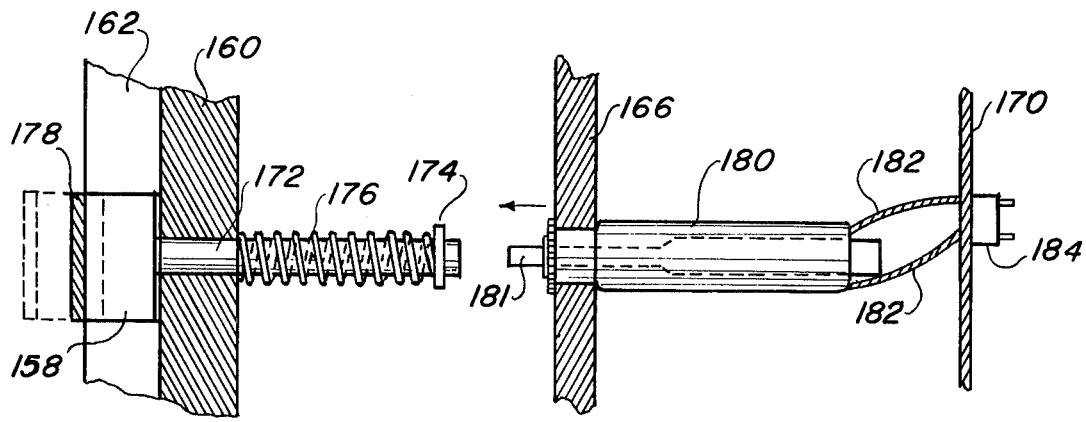
Fig_12
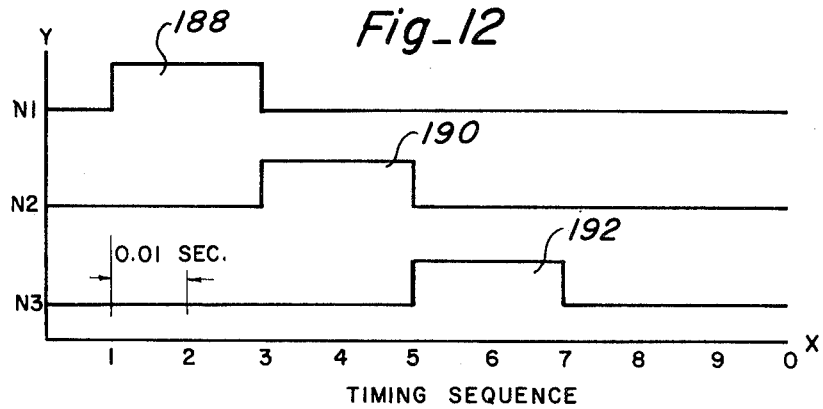
TIMING SEQUENCE
Fig_13
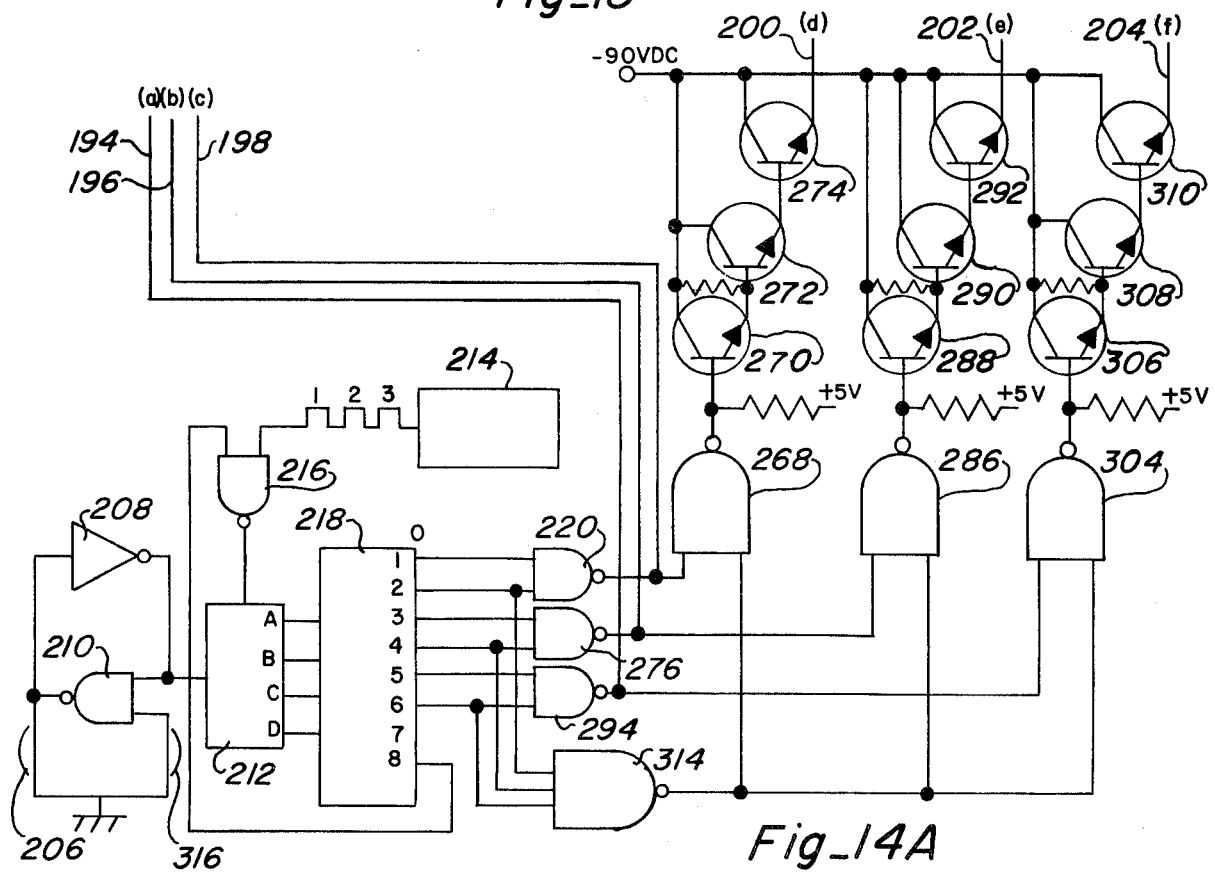
Fig_14A

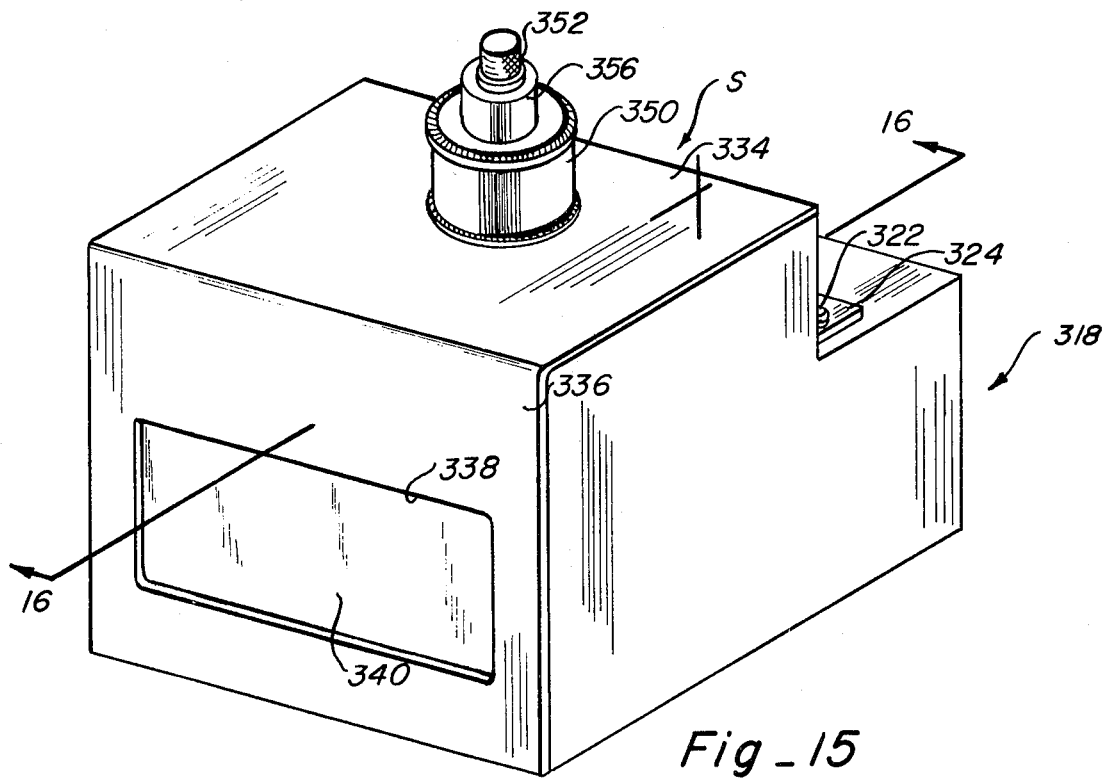
Fig _ 15
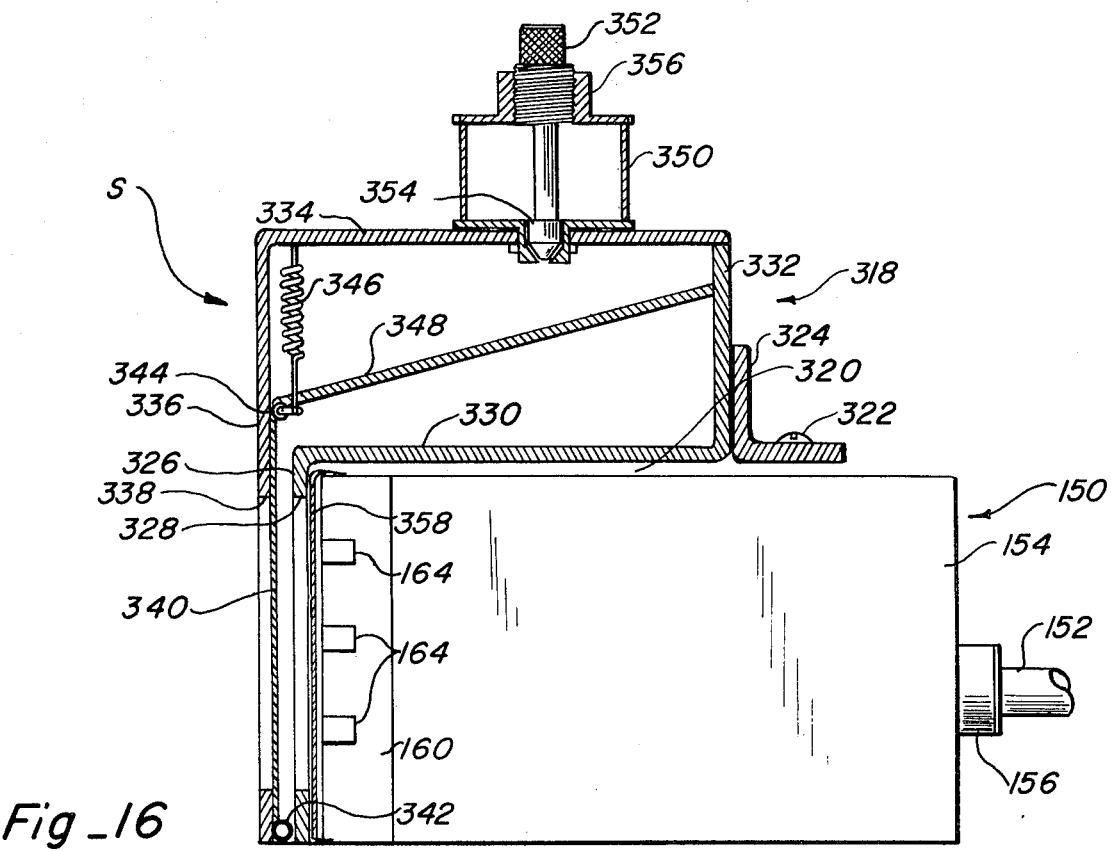
Fig _ 16

WEIGHING SCALE DIGITAL PRINTER

BACKGROUND OF THE INVENTION

1. Field of the Invention

This invention relates to a solid state printer and more particularly to solid state printers for printing weights on carcasses, boxes or other products after they have been weighed.

2. Description of the Prior Art

It is common in the industry to weigh articles and then mark them with the weight either at the scale or at a subsequent station. An example for such a device is shown in U.S. Pat. No. 3,080,813 which issued Mar. 12, 1963 to Staub, et al. This structure has the disadvantage of being quite complex and requiring the setting of the numbers to be printed by means of indexing wheels. Various types of solid state printers are known, such as that shown in U.S. Pat. No. 3,112,693 which issued on Dec. 3, 1963 to Williams. In this structure electrostrictive material is used for the digital segments. However, because of the small amount of extension possible with electrostrictive material this type of printer is not suitable for marking weighed articles but is usable only for printing the weight on a separate paper. A similar electrostrictive printer is shown in U.S. Pat. No. 3,242,855 which issued Mar. 29, 1966 to Noll, et al.

SUMMARY OF THE INVENTION

In accordance with the present invention, an electronic weighing scale provides an output signal in response to an article being weighed which signal is used to activate appropriate segments of a digital printer to cause them to be extended in response to the article which has previously been weighed and to place indicia on the article indicative of its weight.

More particularly, in one form of the invention a portable printer is provided having digital segments which are activated by the output signal from the scale and are advanced outwardly and then locked in advanced position for inking and placing the indicia of the weight of the article previously weighed on that article. The digital segments will remain in this position until a switch on the printer is closed again after weighing of another article, whereupon the new output signal from the scale will reposition the segments in accordance with the new weight for printing that weight on the next article.

In another form of the invention, the digital printer is used for marking boxes which have been previously weighed on a conveyor scale. In this embodiment, the driver sequentially activates the segments for each digit after the box is positioned for printing. In this way, the deformation of the side of the box caused by the printer will not interfere or prevent all digits from printing clearly since only one digit will strike the box at a time. If all were activated simulataneously, the center of the box would be deformed more than the ends and thereby cause the digits to print well at the ends but perhaps not print clearly in the middle. An inking device is provided wherein the digital segments strike the back of an inked ribbon which in turn prints the image on the box. A flexible ink impervious member may be provided between the ribbon and the segments so that ink does not touch the segments themselves.

It can be seen that marking of irregular objects, such as carcasses, can be done rapidly and with a relatively simple, low cost printer. Also, boxes can be marked after being weighed on a conveyor printer and the weight will be clearly shown thereon due to the sequential marking of each digit. Additional advantages and novel features of the invention will become apparent from the description which follows, taken in conjunction with accompanying drawings.

BRIEF DESCRIPTION OF THE DRAWINGS

FIG. 1 is a diagramatical view of a portable digital printer in accordance with this invention;

FIG. 2 is an enlarged, partially-exploded perspective view of the internal mechanism of the printing head of FIG. 1;

FIG. 3A is an enlarged longitudinal section, taken along line 3—3 of FIG. 2, showing a segment in retracted position;

FIG. 3B is a longitudinal section, similar to FIG. 3A but showing a segment in extended position;

FIG. 4 is an enlarged offset section, taken along line 4—4 of FIG. 2, showing the segment locking mechanism;

FIG. 5 is a side elevation, taken along line 5—5 of FIG. 4 showing further details of the segment locking mechanism;

FIG. 6 is a graph showing the time sequence of the lock solenoid and segment solenoid;

FIG. 7A is a diagram of the portion of the encoder-driver logic;

FIG. 7B is a diagram of the remainder of the encoder-driver logic;

FIG. 8 is a truth table showing the operation of the segments;

FIG. 9 is an enlarged view of one digit showing the segments as viewed from the rear;

FIG. 10 is a diagramatic view of an alternative embodiment showing a box printer used in conjunction with a conveyor scale;

FIG. 11 is an enlarged, partially-exploded, perspective view of the printing head assembly for the box printer of FIG. 9;

FIG. 12 is an enlarged longitudinal section taken along 12—12 of FIG. 10 showing details of a segment and solenoid therefor;

FIG. 13 is a graft showing the time sequence of several solenoids used in the printing head of FIG. 10;

FIG. 14A is a diagram of a portion of the encoder-driver logic for the printing head of FIG. 10;

FIG. 15 is a perspective view of the inker assembly used in conjunction with the printing head of FIG. 11; and FIG. 16 is a longitudinal section, taken along line 16—16 of FIG. 15, showing further details of the inking assembly.

DESCRIPTION OF THE PREFERRED EMBODIMENTS

Figure 14B:
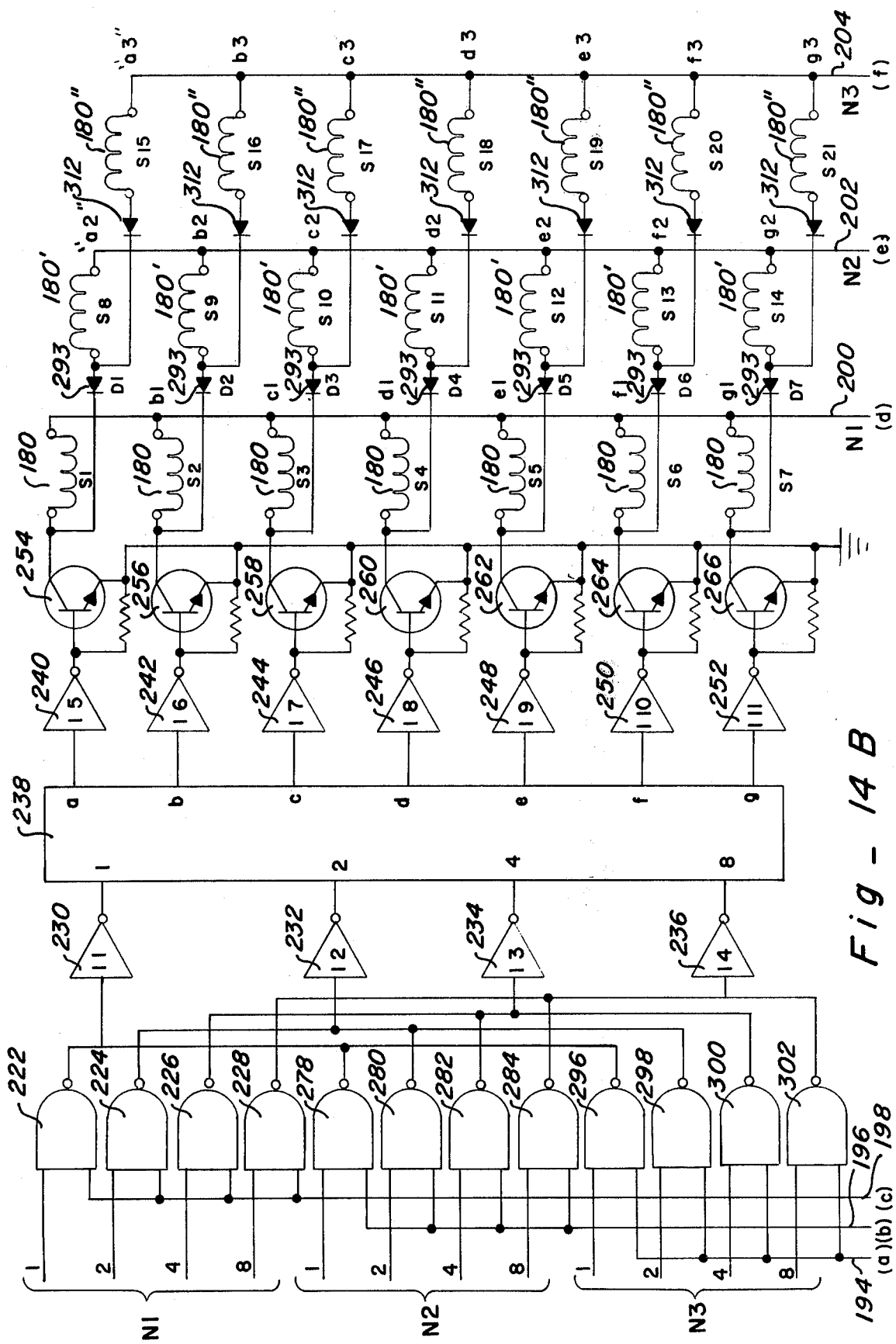
FIG. 14B is a diagram of the remainder of the encoder-driver logic.

In accordance with this invention a portable printer P is provided, as shown in FIG. 1 which includes a scale 2 for weighing a product 4, such as a side of beef, as shown, a solid state control unit or driver 6 and a printing head 8. The electronic scale is connected to driver 6 by means of an input line 10 for transmitting a signal from scale 2 indicative of the weight of the product being weighed. The signal is encoded by driver 6 and then transmitted by cable 12 to printing head 8 where it effects the advancement of segments 14, as shown in FIGS. 1 and 2, in a manner to be described. Conveniently, printing head 8 is supported from a flexible member 16 by an eye 18 connected to the top of printing head 8, as shown. After the product 4 has been weighed the operator can grasp printing head 8 by handle 20 and by squeezing trigger 21 a switch will be closed which will activate the appropriate segments 14 so that they are advanced outwardly beyond the face of the printing head whereupon they can be inked on an inking pad, not shown, then the weight can be placed on the product 4 by bringing the inked printing head against the surface thereof, as is well known in the art.

As best seen in FIG. 2, the printing head includes a guide block 22 having a series of generally vertical slots 24 as shown and another series of transverse or horizontal slots 26 for slidably receiving vertical and horizontal segments 14 which are arranged to form the respective digits to be printed. The guide block is supported by threaded studs 28 which extend through and are connected to solenoid mounting plate 30, the aft end of the studs being connected to terminal strip board 32. It will be understood that all of these associated parts are received within housing 34 of printing head 8 with guide block 22 forming the front face thereof, but they have been shown displaced forwardly thereof for clarity of illustration.

As will be explained in more detail below, when trigger 21 is squeezed the electronic signal from driver 6 will initially energize lock solenoid 36 which causes armature rod 38 to move to the right, as viewed in FIGS. 2 and 4, thereby causing lock release lever 40 to be pivoted about pin 42 on which it is mounted between legs 44 and 46 of mounting plate 30, as best seen in FIG. 2. Rod 38 has a stop 47 thereon to limit its movement. This pivotal movement of lock release lever 40 urges segment locking plate 48 to the left, as viewed in FIGS. 2 and 4 against the force of springs 50 and 52 connected to ears 54 and 56, respectively, of mounting plate 58. As can be seen from FIG. 2, segment locking plate 48 is mounted for sliding movement across mounting plate 58 on studs 60 extending through elongated slots 62, as shown. Conveniently, mounting plate 58 is separated from solenoid mounting plate 30 by means of spacers 64 through which mounting bolts 28 extend.

Conveniently, as best seen in FIGS. 3A and 3B, each of the printing segments 14 includes a rearwardly extending stem 66 having a peripheral groove 68 adjacent the rear end thereof. A coil spring 70 surrounds stem 66, one end thereof engaging the rear face of guide block 22 and the other end engaging a collar 72 to urge segment 14 rearwardly, as into recess 24, and thereby hold it in retracted position. Conveniently, the forward end of each segment 14 is provided with a pad 74, such as rubber, to which ink can be applied for stamping on the article which has been weighed. As can be seen from FIGS. 3A and 4, when a segment 14 is in the retracted position, the end of a slot 76 in segment locking plate 48 will be in engagement with groove 68 to provide a positive lock of the segment in a retracted position.

When trigger 21 is pulled and locking solenoid 36 activated lock release lever 40 will push segment locking plate 48 to the left as viewed in FIG. 2 and 4 and thereby align slots 76 with stems 66 whereupon the solenoids 78 for any selected segment is energized so that the armature rod 82 is advanced forwardly to position the segment in the inking position as shown in FIG. 3B. When a solenoid 78 is activated its armature 82 pushes segment 14 forwardly against the force of spring 70 whereupon locking solenoid 36 will be de-energized allowing segment locking plate 48 to return to its initial position whereupon the end of slot 76 will not be behind the end of stem 66 so that segment 14 is now positively locked in extended position. Thereafter, solenoid 78 will be de-energized so that armature 82 is retracted to its initial position.

This time sequence can best be understood by referring to FIG. 6 wherein the locking solenoid will be energized one microsecond after squeezing trigger 21 as shown by graph 84 and will remain activated until the seventh microsecond thereafter whereupon it will become deactivated. The solenoid 78 for each segment will be activated after three microseconds as shown in graph 86 and will remain activated until the ninth microsecond whereupon it will be released. Thus, the locking solenoid will be energized sufficiently ahead of the segment solenoid so that the segment locking plate can be moved to open position and will return to the closed position only after the segment solenoid has been energized for sufficient length of time to advance printing segment 14. After the locking solenoid has been de-energized and segment locking plate 48 returned to its initial closed position, then the segment solenoid 78 will be de-energized and returned to its initial position.

It will be understood that when trigger 21 is squeezed, all of the segment solenoids 78 which are to be advanced to form the number to be printed will be energized simultaneously and that the whole operation of opening the segment locking plate advancing the appropriate segments, closing the segment locking plate and de-energizing the segment solenoids will take place in about nine microseconds. The advanced segments will then stay in this position until trigger 21 is squeezed the next time and a signal is provided indicative of the weight of the next product to be stamped. Of course, the next time the trigger is squeezed and the segment locking plate is opened all of those segments which were advanced before will return to their retracted position by coil spring 70. If the segment solenoid 78 for that particular segment is energized by the new signal, that segment 14 will be advanced again and locked in the advanced position. A truth table is shown in FIG. 8 showing which segments 14 are to be advanced to make any particular digit, the segments in the truth table corresponding to the segments as shown in FIG. 9 wherein the digit is viewed from the rear of guide block 22.

FIGS. 7A and 7B show the circuitry for one of the digits, it being understood that the circuitry of FIG. 7A joins the circuitry of FIG. 7B at point (a). As seen in FIG. 7B, binary input contacts 88 to which a signal is provided from cable 12 of driver 6 as shown in FIGS. 1 and 2. The signal is transmitted through a cable harness 90, shown in FIG. 2, to the inputs of a seven segment decimal decoder 92 of FIG. 7B which has seven outputs (a–g) each corresponding to one of the seven segments of the digit. The output signal will be provided only from those outputs corresponding to the segments to be activated and this signal will be inverted by the respective inverters 94 which provides a signal to the base of the respective transistors 96 which are connected in parallel with each other and in series with their respective segments solenoids 78. Thus, when an input signal is supplied along lead 98 from bridge circuit 100 of FIG. 7A in a manner to be described, the circuit will be completed through those segments solenoids 78 connected to transistors 96 to which a signal has been provided to the base thereof corresponding to the input signal to the decoder. It will be understood that the circuitry shown in FIG. 7B is for one digit only, and that this circuitry must therefore be duplicated for each additional digit.

When trigger 21 is squeezed, switch 102 will be closed connecting AND gate 104 to ground so that it will provide a one output to inverter 106 which in turn provides a zero output back to the other input of AND gate 104 to keep it energized after switch is open and this same signal is provided to an input to binary counter 108. A pulse generator 110 provides a signal to AND gate 112 which in turn provides a signal to binary counter 108 since the other input to AND gate 112 has a one input at this time. The signal from the binary counter 108 is supplied to a decimal decoder 114 which provides outputs from its respective leads at one microsecond increments from zero to nine. Thus, once the time sequence reaches one microsecond AND gate 116 will be energized and will provide a zero or ground signal to AND gate 118 of the lock solenoid switching circuit which in turn will provide a one signal to inverter 120 which in turn will provide a zero signal to solid state relay 122 to complete the AC circuit from an AC power source 124 through lock solenoid 36 and cause segment locking plate to be slid to the left, as viewed in FIG. 2, as previously described.

Since all of these functions will happen essentially simultaneously, the lock solenoid 136 will be energized at the end of one microsecond after the operator squeezes trigger 21 to close switch 102, as shown in the graph of FIG. 6. As will be apparent, power source 124 will provide AC power for bridge circuit 100 through transformer 126.

It can be seen that at the end of three microseconds the signal from decimal decoder 114 will then be supplied to AND gate 128 which will provide a zero output to one of the inputs of AND gate 130 which forms part of the segment solenoid switching circuit. AND gate 130 will provide a one output to an inverter 132 which in turn will provide a zero output to solid state relay 134 thereby completing the AC circuit to bridge 100 which in turn supplies an output signal along lead 98 to the segments solenoids 78 so that the appropriate ones thereof are energized to advance the appropriate segments 14 for the digit to be printed. When seven microseconds have expired after the closing of switch 102, AND gate 116 will be shut down which will de-activate lock solenoid 36 so that segment locking plate 48 can return to its initial position under the influence of springs 50 and 52, as viewed in FIG. 2. This time sequence for the lock solenoid is shown in graph 84 of FIG. 6.

Upon the expiration of nine microseconds, AND gate 128 will be de-energized which will de-activate solid state relay 134 and hence segments solenoids 78 which will return from the position shown in FIG. 3B to the position shown in FIG. 3A. However, the segments 14 will not return to their initial position because segment locking plate 48 will have closed behind them and will engage the terminal end of stem 66. At the expiration of nine microseconds the decimal decoder 114 will provide a ground signal to AND gate 112 which will interrupt the transmission of signals from pulse generator 110 to binary counter 108 and thereby reset the decimal decoder 114. This same ground signal will be supplied through diode 136 and cancel the signal from AND gate 104 and since a one signal will then be supplied through inverter 106, AND gate will be de-activated until the next time that trigger 21 is squeezed to close switch 102. Of course, after the next product 4 has been weighed then the operator can again squeeze trigger 21 which will start the operation again and this time a new signal will be provided to decoder 92 to activate different segments of the digit assuming that the number of that digit is to be changed. As pointed out above, the circuitry shown is for one digit only but it will be understood by those skilled in the art that multiple digits can be provided with suitable circuitry for them.

An alternative embodiment is shown in FIGS. 10–16 wherein a stationary printer S is provided as shown in FIGS. 10 and 11 for placing indicia on packages or boxes 138 indicating the weight thereof. Thus, as best seen in FIG. 10 a box 138 will pass across a box feeding conveyor 140 to an in-motion scale conveyor 142 which weighs the package and transmits through circuitry, now shown, a signal to stationary printer S so that when the box 138 reaches a box printing conveyor 144 the weight of the box can be printed theron. Advantageously, a box on conveyor 144 will be pushed against stationary printer S by a pneumatic device 146 and while held against the stationary printer, indicia indicating the weight will be marked thereon. After marking, the box will pass to a box outtake conveyor 148. The stationary printer S includes a printing head 150, as seen in FIG. 11 which receives a signal from conveyor scale 142 through a cable 152 which connects to the printer head housing 154 by means of a plug 156. As in the previous embodiment, printing head 150 includes a plurality of digital segments 158 mounting for sliding movement within a guide block 160 in vertical slots 162 and horizontal slots 164 as shown in FIG. 11. Thus, segments 158 can be selectively advanced outwardly to form any digit to be printed on a package 138. Guide block 160 is supported forwardly of solenoid mounting plate 166 by mounting bolts 168 which also support terminal strip board 170 rearwardly of the solenoid mounting plate 166, as shown. All of these parts are normally located within housing 154, with guide block 160 forming the front face or cover thereof.

As best seen in FIG. 12, each segment 158 includes a rearwardly extending stem 172 having a collar 174 adjacent the end thereof for engaging one end of the coil spring 176 extending around the stem and whose other end engages the back surface of guide block 160. Thus, spring 176 urges segment 158 rearwardly and thus holds it in retracted position, as in slot 162. Conveniently, each of the segments 158 may be provided with a pad 178 on the front surface thereof for printing the numbers on the box as more fully described below.

Rearwardly of each stem 172 is a segment solenoid 180 mounted in solenoid mounting plate 66 as best seen in FIGS. 11 and 12 and having a pair of wires 182 extending through terminal strip board 170 and terminating in a connector 184. This connector is attached to the wires of a cable harness 186, as shown in FIG. 11, which terminates in the rear wall of housing 154 and is connected to plug 156.

As will be apparent from FIG. 12, upon energization of solenoid 180, stem 172 and its associated segment 158 will be pushed forwardly but upon deactivation of the solenoid the stem and segment will move back to the retracted position under the influence of coil sprint 176. Thus, there is no means for locking the segments in extended position and this is desirable with a box printer. The reason for this is that the side of the box tends to be deformed when struck by segments forming each digit and if several digits are advanced at the same time the box will tend to bend inwardly more at the center than at the sides and therefore the printing will not be even across the box. With the present invention, the segments for each digit are simultaneously advanced and then retracted and then the segments for the next digit are advanced and retracted simultaneously so that the box is only deformed by a single digit being pressed against the box at a time. In this way, a clear printing of all of the numbers will be accomplished. FIG. 13 includes three graphs showing the time sequence for three digits. Graph 188 shows the sequence for digit N1 wherein the segments for that digit are advanced after one microsecond and retracted at the end of three microseconds and then the segments for number N2 are advanced from the third to the fifth microsecond as in Graph 190 and finally the segments for digit N3 are advanced from the fifth to the seventh microsecond as in Graph 192. Obviously, if additional digits are present they will be similarly sequenced. The same truth table will apply to this embodiment as to the embodiment of FIGS. 1-9 in determining which segments are advanced for the particular digits to be formed.

The circuitry for this embodiment is shown in FIGS. 14A and 14B, being understood that lines 194, 196, 198, 200, 202, and 204 in the respective figures are interconnected at points (a) through (f) respectively.

When the pneumatic device 146 of FIG. 10 has positioned a package 138 against stationary printer S a mechanism (not shown) may be provided for closing switch 206 of FIG. 14A which will provide a ground or zero signal to inverter 208 which in turn will provide a one signal to the input of AND gate 210 which then will provide a ground signal continuously to the inverter 208 to cause the circuitry to continue operating. The same one signal from inverter 208 will be supplied to binary counter 212 which will receive pulses from pulse generator 214 through AND gate 216. The other input to AND gate will receive a one signal from decimal decoder 218. The output from binary counter 212 is supplied to a decimal decoder 218 which provides output zero or ground signals in microsecond increments as shown. Thus, at the end of one microsecond a zero input signal will be provided to AND gate 220 which will then provide a one signal through line 198 to AND gates 222, 224, 226 and 228, respectively, of FIG. 14B. These gates will selectively receive input signals at their other inputs from scale conveyor 142 indicative of the weight of the box which was previously weighed for the first digit N1. Thus, these latter AND gates will then provide either a one or a zero output signal to inverters 230, 232, 234 and 236, respectively, depending on the digital input signal which in turn will supply selective one signals to the binary inputs of a seven segment decimal decoder 238. The output from decoder 238 will correspond to the segments (a–g), those outputs corresponding to the segments which are to be activated in accordance with the truth table for that digit and will provide a ground signal to the respective inverters 240–252 which in turn will provide a one signal to the base of transistors 254–266, respectively. Of course, it will be understood that signals will be provided only to those transistors which correspond to the segments to be activated for the particular digit to be printed on the box.

The one signal from AND gate 220 of FIG. 14A is also provided to AND gate 268 which in turn provides a one signal to the base of transistor 270 which then becomes conducting and supplies a signal to the base of transistor 272 which in turn becomes conductive and supplies a signal to the base of transistor 274 which then becomes conductive and provides a 90 volt DC signal to solenoids 180 of FIG. 14B and those solenoids which are connected to transistors whose bases have a potential applied to them will be energized to cause segments 158 to be pushed outwardly by the core 181 of the solenoid and thereby print the digit N1 on the box. These solenoids will continue to be actuated until the third microsecond whereupon AND gate 220 will be de-activated and will no longer provide an output to energize the circuit.

At the beginning of the third microsecond AND gate 276 is energized providing an output to line 196, AND gates 276–284 of FIG. 14 which receives second input signals from the digital data indicative of the weight of the box and these gates in turn supply signals to inverters 230–236 indicative of N2. Thus, the appropriate transistors 254–266 will have potentials applied to their base so that their respective solenoids 180 can be energized. This signal from AND gate 276 of FIG. 14A is also supplied to AND gate 286 which in turns supplies a potential to the base of transistor 288 which then becomes conducting and provides a signal to the base of transistor 290 which in turn becomes conductive and supplies a signal to the base of transistor 292 which also becomes conductive and provides a 90 volt DC signal through lead 202 to solenoids 180' which are connected to respective transistors 254–266 through diodes 293. The solenoids for those transistors which have been made conducting will then be energized to advance the appropriate segments to print the next numeral N2. These solenoids will be energized until the fifth microsecond whereupon AND gate 276 will be de-energized and the associated circuitry connected therewith will be de-energized. But AND gate 294 of FIG. 14A will now become energized and will provide a one signal through wire 194 to AND gates 296–302 of FIG. 14B and will provide appropriate signals in response to the binary input to these AND gates from scale conveyor 142 so as to apply voltage to selected ones of transistors 254–266 indicative of N3. This same signal from AND gate 294 is also supplied to AND gate 304 of FIG. 14A which then applies the signal to the base of transistor 306 which then becomes conducting and provides a signal to the base of transistor 308 which in turn becomes conducting and applies a signal to the base of transistor 310. When transistor 310 becomes conductive it applies a 90 volt DC voltage through line 204 to solenoids 180" and through diodes 312 and 293, thus, the solenoids 180" which are associated with the transistors 254–266 to which a base potential has been applied will be energized to print the number N3. It will be apparent to one skilled in the art how circuitry can be provided for additional numerals if desired.

As seen in FIG. 14A, an AND gate 134 has inputs from the two, four and six microseconds position on decimal decoder 218 and its output is connected to the inputs of AND gates 268, 286 and 304 respectively. Thus, as the counter counts down the respective gates to which gate 314 is connected will be energized to provide a signal as described above to the respective sets of solenoids 180, 180' and 180'' for printing the individual digits sequentially on a box.

When the decimal decoder 218 reaches the eight microsecond position a ground signal is provided to AND gate 216 which interrupts the signal from the pulse generator the binary counter and thereby re-sets the counter. Furthermore, means can be provided at this point to close a reset switch 316 which will provide the ground or zero signal to AND gate 210 and thereby interrupt the signal to inverter 208 and terminate the input to the binary counter. Of course, when the next box is weighed and in position for marking the sequence will be repeated.

Turning now to FIGS. 15 and 16, it can be seen that printing head 150 is mounted within inker assembly 318 which includes a lower receptacle 320 for receiving the printing head, the latter being held in place therein by a fastening means 322 extending through angle member 324, as shown. The receptacle includes a front wall 326 having an opening 328 through which the segments of guide block 160 are adapted to extend when energized. The upper end front wall 326 terminates in a top wall 330 which extends rearwardly to angle member 324 and then extends upwardly to form a back wall 332 of the ink dispenser. The ink dispenser includes a top wall 334 extending forwardly from rear wall 332 and then downwardly to form a front wall 336 which is spaced from front wall 326 and has an opening 338 therein which corresponds with opening 328 of front wall 326 both in size and position. A silk ribbon 340 extends between front walls 326 and 336 and is attached to a fastening member 342 at the bottom and to an upper fastening member 334 which holds the ribbon 340 in tension under the influence of coil spring 346 attached to the bottom side of top wall 334, as shown. A sheet of blotter material 348 is attached to the upper end of the silk ribbon and extends upwardly diagonally across the ink receptacle as shown to rear wall 332. On top of top wall 334 is an ink receptacle 350 having a stopper 352 with a depending valve 354 which can be adjusted by rotating stopper 352 in the threaded collar 356 of the receptacle to control the flow of ink from reservoir 350 onto the blotter material 348 and hence onto to silk ribbon 340.

Advantageously, between guide block 160 and silk ribbon 340 is located an ink impervious sheet 358, made of "Teflon" or similar material, which will prevent any ink on ribbon 340 from getting on the pads 178 of segments 158 to maintain them in a clean condition. Thus, when the segments are activated they will be pushed forwardly so that they strike teflon sheet 358 and in turn strike ribbon 340 which in turn will strike the package and imprint the digital information corresponding to the weight of the package thereon.

From the foregoing, the advantages of this invention are readily apparent. An automatic printer has been provided for marking packages which is of relatively simple construction and operates at high speed in an efficient manner. In one embodiment, the printer is portable and segments in a printing head are advanced selectively to form the digits to be printed in response to weight of the article to be marked and these digits are moved to an extended position by solenoids energized by the operator and are held in advance position so that the segments may be inked and then impressed on the article to place the marking thereon. Upon subsequent squeezing of a trigger on the device the segments previously extended will be retracted and segments corresponding to the new digits to be marked for the weight of the next article will be extended.

In another embodiment, a stationary box printer is provided for sequentially placing digital information indicative of the weight of a box on the side of the box, the sequential operation of the digits serving to assure that the inward deflection of the box will not interfere with clear marking of the indicia thereon.

The invention has been described in detail with particular reference to preferred embodiments thereof, but it will be understood that variations and modifications can be effected within the spirit and scope of the invention.

What is claimed is:

1. A weighing scale digital printer apparatus for placing indicia on a weighed article subsequent to weighing, indicative of the weight of the article, said apparatus comprising:

an electronic scale providing an electrical output indicative of the weight of an article on the scale; and a printing head having printing segments which can be advanced selectively to form digital information and print the information on the article, said printing head comprising:

a housing;

a guide block mounted in said housing and having slots therethrough for receiving said segments and also having a back face;

stems extending rearwardly from said segments and into said housing, said stems having collars adjacent the rear end thereof and coil springs mounted on said stems having one end engaging said collars and the other end engaging the back face of said guide block to urge said segments toward retracted position;

a solenoid mounting plate spaced rearwardly of said guide block; and solenoids mounted in said solenoid mounting plate and each positioned respectively behind one of said stems of said segments for selectively advancing said segments in response to an electrical output signal from said electronic scale.

2. A printer apparatus, as claimed in claim 1, further including;

a driver connected to the electrical output of said scale to encode the signal and transmit it to said printing head.

3. A printer apparatus, as claimed in claim 1, wherein said printing head further includes:

means to hold said segments in advanced position after selective movement thereof to such advanced position by said solenoids.

4. A printer apparatus, as claimed in claim 3, wherein said holding means includes:

a locking plate mounted between said guide block and said solenoid mounting plate and having a plurality of slots corresponding in number to the number of segment stems and solenoids so that the stems and solenoids can extend through the slots, said locking plate being movable between an open position in which said stems can freely move through said slots and a locked position in which said stems are held in a fixed position;

a locking plate solenoid energizable to move said locking plate from closed position to open position in response to an electrical output signal from said electronic scale; and resilient means for urging said locking plate from said open position to said closed position upon de-energization of said locking plate solenoid.

5. A printer apparatus, as claimed in claim 1, wherein said printing head further includes:

circuitry of advancing the sets of segments for each digit sequentially so that the digits are printed one at a time.

6. A weighing scale digital printer apparatus for placing indicia on a weighed article subsequent to weighing, indicative of the weight of the article, said apparatus comprising:

an electronic scale providing an electrical output indicative of the weight of an article on the scale;

a printing head comprising:

a housing;

a guide block mounted in one end of said housing and having a plurality of parallel horizontal and vertical slots therethrough and also having a rear face, said slots being arranged to receive sets of segments which are movable within said slots and can form any desired digit, said segments each having a rearwardly extending stem with a collar adjacent the end thereof and a coil spring around said stem having one end bearing against said collar and the other end bearing against the rear face of said guide block to urge each said segment toward retracted position;

a solenoid mounting plate spaced rearwardly of said guide block and having a plurality of solenoids mounted therein said solenoids corresponding in number and location with said segment stems for respective engagement with said stems for urging said segments forwardly;

a mounting plate located between said guide block and said solenoid mounting plate having openings therein through which said stems and said solenoids can selectively extend;

a locking plate mounted on said mounting plate and having elongated slots corresponding in position to said openings in said mounting plate and being movable between an open position in which said stems can move back and forth through said slots and a locked position in which said stems are held in a fixed position, and means for moving said locking plate between said open and closed position; and circuitry for energizing selective solenoids simultaneously in response to the electrical output from said electronic scale to advance all segments of all of the digits to be printed and to activate said moving means to lock the segments which are advanced by the solenoids in advanced position.

7. A printer apparatus, as claimed in claim 6, wherein said moving means for said locking plate includes:

a lock release lever pivotally mounted on said solenoid mounting plate and having one end in engagement with said locking plate;

a lock solenoid mounted within said housing and operatively connected to the other end of said lock release lever for pivoting said lever to urge said locking plate from closed position to open position; and spring means interconnecting said locking plate and said mounting plate for urging said locking plate toward said closed position upon de-energization of said lock solenoid.

8. A printing apparatus as claimed in claim 7, wherein said circuitry includes:

trigger means for activating said circuitry in response to the output signal for said electronic scale; and circuit means for first energizing said lock solenoid to move said locking plate from said locked position to unlocked position and then subsequently energizing the solenoids of said segments to be advanced thereby causing advancement of said segments and then to subsequently de-energize said lock solenoid to move said locking plate from unlocked position and locked position to hold said segments in fixed position to finally de-energize said segments solenoids.

9. A printing apparatus as claimed in claim 6, wherein each of said stems includes a peripheral groove located rearwardly of said collar and engageable by the elongated slots of said locking plate for locking said segments in retracted position.

10. A weighing scale digital printer apparatus for placing indicia on a weighed article subsequent to weighing, indicative of the weight of the article, said apparatus comprising:

an electronic scale providing an electrical output indicative of the weight of an article on the scale;

a printing head comprising:

a housing;

a guide block mounted in one end of said housing and having a plurality of parallel horizontal and vertical slots adapted to receive sets of segments which are movable within said slots and can form any desired digit, said segments each having a rearwardly extending stem with a collar adjacent the end thereof and a coil spring around said stem having one end bearing against said collar and the other end bearing against the rear face of said guide block to urge said segment toward retracted position; and a solenoid mounting plate spaced rearwardly of said guide block and having a plurality of solenoids mounted therein said solenoids corresponding in number and location with said segment stems for respective engagement with said stems for urging said segments forwardly;

cicuitry for energizing the solenoids in response to the electrical output from said electronic scale to advance selective segments to form digits which are to be printed;

an inker assembly comprising:

a printing head receptacle for receiving the printing head and having an opening through which said segments are extendable for contact with the package to be marked;

a ribbon extending across said opening for being struck by said segments against said package for placing indicia on the package;

ink supply means for providing ink to the ribbon for being transferred to the package upon striking of the ribbon by the segments;

a front plate spaced forwardly of said printing head receptacle and having an opening aligned with said opening of said receptacle, said ribbon being positioned between said front plate and the front of said printing head receptacle;

tension means for holding said ribbon taut;
blotter means connected to said ribbon for supplying ink from said ink supply means to said ribbon; and
drip control means in said ink supply means for controlling the flow of ink from said ink supply means to said blotter.

11. A printer apparatus, as claimed in claim 10, wherein said inker assembly further includes:
an ink impervious sheet mounted between said printing head and said ribbon to prevent ink from said ribbon from getting on said segments when said segments strike said ribbon to place indicia on a package.

* * * * *